United States Patent Office 3,690,908
Patented Sept. 12, 1972

---

3,690,908
HIGH INDEX OPTICAL GLASS
Edgar J. Greco and Gerald E. Blair, Rochester, N.Y., and Guy E. Rindone, State College, Pa., assignors to Eastman Kodak Company, Rochester, N.Y.
No Drawing. Filed Oct. 1, 1970, Ser. No. 77,330
Int. Cl. C03c *3/30, 3/02, 3/12*
U.S. Cl. 106—47 Q          3 Claims

ABSTRACT OF THE DISCLOSURE

An optical glass having a high index of refraction and low absorption in the visible region of the spectrum contains as components tellurium dioxide, lanthanum oxide, boron oxide, potassium oxide, tantalum pentoxide, and germanium dioxide.

BACKGROUND OF THE INVENTION

Field of the invention

This invention relates to optical glasses, and in particular to optical glasses having high indices of refraction and high transparency.

Description of the prior art

The quality of optical systems such as those used in photography is substantially enhanced by the incorporation of lens components having high refractive indices, exceeding for example 2.00, but the necessity that these components have very low color, i.e. low absorption in the visible region of the spectrum, has impeded the development of such glasses. For example, U.S. Patent 3,291,620 discloses an optical glass having an index of refraction exceeding 2.00, but that glass has a very high blue absorption which severely limits the use of that glass for photographic purposes. This blue absorption gives the glass a yellow-green color and has been attributed to the presence of tungsten oxide in the glass. Tungsten oxide improves the chemical stability of the glass, but hampers its usefulness as a lens material. The glass disclosed in the cited patent has additionally been found to have an undesirably high absorption in the red region of the spectrum. Other optical glasses are known having similarly high refractive indices but those glasses have excessive absorptions of both blue and green in the visible region of the spectrum.

Optical glasses having low color as well as high refractive indices find particular utility in cameras because their transmission characteristics reduce the minimum light level at which highly sensitive photographic film can be satisfactorily exposed in a camera. Thus, the level of ambient illumination of which such exposures can be made would be reduced with a colorless lens, making resort to artificial lighting devices less frequent for the photographer. Such glasses have heretofore not been available to designers of optical systems for cameras. Moreover, present glasses having high indices of refraction have Abbé numbers (i.e. reciprocal dispersive powers) which are relatively low, whereas high Abbé numbers are desired in optical glasses (the glass disclosed in the above-cited patent allegedly has an Abbé number range of 16.5–17.5).

SUMMARY OF THE INVENTION

An object of the invention is to provide an optical glass having a high index of refraction and low absorption in the visible region of the spectrum.

Another object of the invention is to provide a low color, highly refractive optical glass from which camera lens components can be practicably made.

An additional object is to provide an optical glass having a high index of refraction and a low dispersion.

A further object is to provide an optical glass of the foregoing types which can be manufactured under normal glass making conditions. Other objects will become apparent from the description to follow and from the appended claims.

The invention achieves the foregoing objects by the provision of optical glasses consisting essentially of components in the following range of percentages by weight:

| Component: | Weight percent |
|---|---|
| Tellurium dioxide ($TeO_2$) | 60–85 |
| Lanthanum oxide ($La_2O_3$) | 5–35 |
| Aluminum oxide ($Al_2O_3$) | 0–5 |
| Boron oxide ($B_2O_3$) | 0–5 |
| Potassium oxide ($K_2O$) | 0–5 |
| Zinc fluoride ($ZnF_2$) | 0–5 |
| Tantalum pentoxide ($Ta_2O_5$) | up to 10 |
| Germanium dioxide ($GeO_2$) | up to 5 |

DETAILED DESCRIPTION OF PREFERRED EMBODIMENTS OF THE INVENTION

The present invention provides optical glasses extremely well suited for lens systems of the type used in cameras. The glasses have very high indices of refraction (2.00 and greater), and low dispersions for these indices (Abbé numbers greater than 19.0). These glasses have been found to absorb no red or green in the visible region of the spectrum, and to absorb significantly less blue in this region than other optical glasses having high refractive indices, as indicated by the high transparency thereof. Therefore, the present glasses have the capacity to transmit substantially more light than previously known optical glasses having similar refracting characteristics.

Optical glasses have been developed according to the invention which have yielded glasses satisfying the criteria of low color and high refractive index particularly well; these glasses have weight compositions within the following ranges which fall within the aforementioned ranges of values:

| Component: | Weight percent |
|---|---|
| $TeO_2$ | 62.1–84.5 |
| $La_2O_3$ | 6.3–31.4 |
| $Al_2O_3$ | 0.0–1.1 |
| $B_2O_3$ | 0.0–1.3 |
| $K_2O$ | 0.0–0.9 |
| $ZnF_2$ | 0.0–0.5 |
| $Ta_2O_5$ | 2.8–7.4 |
| $GeO_2$ | 2.1–4.1 |

These glasses have refractive indices ranging from 2.00 to 2.12. They may be fired in gold crucibles at temperatures of approximately 900° C.

One example of a glass according to the invention has an index of refraction of 2.10, an Abbé number of 19.4, and a weight composition as follows:

| Component: | Weight percent |
|---|---|
| $TeO_2$ | 83.2 |
| $La_2O_3$ | 8.4 |
| $Al_2O_3$ | 0.9 |
| $B_2O_3$ | 0.6 |
| $K_2O$ | 0.3 |
| $Ta_2O_5$ | 3.2 |
| $GeO_2$ | 3.4 |

It has been found that in the production of large scale melts (on the order of 8,000 grams), a more homogeneous glass can be produced if the aluminum oxide ($Al_2O_3$) is eliminated. A glass of the following weight composition has been made accordingly:

| Component: | Weight percent |
|---|---|
| $TeO_2$ | 83.4 |
| $La_2O_3$ | 8.5 |
| $B_2O_3$ | 1.2 |
| $K_2O$ | 0.3 |
| $Ta_2O_5$ | 3.2 |
| $GeO_2$ | 3.4 |

The preceding glass has a refractive index of 2.10 and an Abbe number of 19.4.

The invention has been described in detail with particular reference to a preferred embodiment thereof, but it will be understood that variations and modifications can be effected within the spirit and scope of the invention.

We claim:

1. Optical glasses having a refractive index in the range from 2.00 to 2.12 and an Abbé number greater than 19.0, said glasses consisting essentially of components having a weight composition within the following ranges:

| Component: | Weight percent |
|---|---|
| Tellurium dioxide ($TeO_2$) | 62.1–84.5 |
| Lanthanum oxide ($La_2O_3$) | 6.3–31.4 |
| Aluminum oxide ($Al_2O_3$) | 0.0–1.1 |
| Boron oxide ($B_2O_3$) | 0.0–1.3 |
| Potassium oxide ($K_2O$) | 0.0–0.9 |
| Zinc fluoride ($ZnF_2$) | 0.0–0.5 |
| Tantalum pentoxide ($Ta_2O_5$) | 2.8–7.4 |
| Germanium dioxide ($GeO_2$) | 2.1–4.1 |

2. An optical glass having the weight composition:

| Component: | Weight percent |
|---|---|
| Tellurium dioxide ($TeO_2$) | 83.2 |
| Lanthanum oxide ($La_2O_3$) | 8.4 |
| Aluminum oxide ($Al_2O_3$) | 0.9 |
| Boron oxide ($B_2O_3$) | 0.6 |
| Potassium oxide ($K_2O$) | 0.3 |
| Tantalum pentoxide ($Ta_2O_5$) | 3.2 |
| Germanium dioxide ($GeO_2$) | 3.4 |

3. An optical glass having the weight composition:

| Component: | Weight percent |
|---|---|
| Tellurium dioxide ($TeO_2$) | 83.4 |
| Lanthanum oxide ($La_2O_3$) | 8.5 |
| Boron oxide ($B_2O_3$) | 1.2 |
| Potassium oxide ($K_2O$) | 0.3 |
| Tantalum pentoxide ($Ta_2O_5$) | 3.2 |
| Germanium dioxide ($GeO_2$) | 3.4 |

References Cited

UNITED STATES PATENTS

| 2,763,559 | 9/1956 | Weissenberg et al. | 106—47 R |
| 3,291,620 | 12/1966 | Evstropjev et al. | 106—47 Q |

FOREIGN PATENTS

| 202,491 | 11/1967 | U.S.S.R. | 106—47 Q |

OTHER REFERENCES

Imaoka, M.: Glass-Formation Range and Glass Structure, in Advances in Glass Technology, Plenum Press, N.Y., 1962, pp. 149–153.

TOBIAS E. LEVOW, Primary Examiner

M. L. BELL, Assistant Examiner